United States Patent
Cedar et al.

(10) Patent No.: US 7,590,782 B2
(45) Date of Patent: *Sep. 15, 2009

(54) MULTIPLE REMOVABLE NON-VOLATILE MEMORY CARDS SERIALLY COMMUNICATING WITH A HOST

(75) Inventors: Yoram Cedar, Cupertino, CA (US); Michael Holtzman, Cupertino, CA (US); Yosi Pinto, Kfar Vradim (IL)

(73) Assignee: SanDisk Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/947,131

(22) Filed: Nov. 29, 2007

(65) Prior Publication Data

US 2008/0077719 A1    Mar. 27, 2008

Related U.S. Application Data

(63) Continuation of application No. 11/673,958, filed on Feb. 12, 2007, now Pat. No. 7,305,505, which is a continuation of application No. 11/205,342, filed on Aug. 16, 2005, now Pat. No. 7,177,964, which is a continuation of application No. 10/849,748, filed on May 19, 2004, now Pat. No. 6,948,016, which is a continuation of application No. 09/641,023, filed on Aug. 17, 2000, now Pat. No. 6,820,148.

(51) Int. Cl.
*G06F 13/00* (2006.01)
(52) U.S. Cl. .............................. 710/104; 710/9; 711/115
(58) Field of Classification Search ................ 710/8–10, 710/104; 711/115
See application file for complete search history.

(56) References Cited

U.S. PATENT DOCUMENTS 4,656,620 A    4/1987    Cox (Continued)

FOREIGN PATENT DOCUMENTS

| EP | 221303 | 4/1993 |
|----|--------|--------|
| JP | 8006892 | 1/1996 |
| WO | WO9738370 | 10/1997 |
| WO | WO98/07092 | 2/1998 |

OTHER PUBLICATIONS

CompactFlash Association, "CF+ and Compact Flash Specification, Revision 1.4", Jul. 1999, pp. 1-105.

(Continued)

*Primary Examiner*—Glenn A Auve
(74) *Attorney, Agent, or Firm*—Davis Wright Tremaine LLP

(57) ABSTRACT

Two or more very small encapsulated electronic circuit cards to which data are read and written are removably inserted into two or more sockets of a host system that is wired to the sockets. According to one aspect of the disclosure, command and response signals are normally communicated between the host and the cards by a single circuit commonly connected between the host and all of the sockets but during initialization of the system a unique relative card address is confirmed to have been written into each card inserted into the sockets by connecting the command and status circuit to each socket one at a time in sequence. This is a fast and relatively simple way of setting card addresses upon initialization of such a system. According to a second aspect of the disclosure, the host adapts to transferring data between it and different cards of the system over at least two different number of the data lines commonly connected between the host and all of one or more sockets, each card permanently storing a host readable indication of the number of parallel data lines the card is capable of using. This allows increasing the rate of data transfer when the need justifies an increased card circuit complexity. According to a third aspect of the disclosure, a serial stream of data is sent over a number of data lines from one to many by alternately connecting bits of the stream to a particular number of individual lines.

12 Claims, 7 Drawing Sheets

U.S. PATENT DOCUMENTS

| | | | |
|---|---|---|---|
| 4,660,141 A * | 4/1987 | Ceccon et al. ............... 710/9 |
| 4,730,251 A | 3/1988 | Aakre et al. |
| 4,910,655 A | 3/1990 | Ashkin et al. |
| 4,918,598 A | 4/1990 | Ashkin et al. |
| 5,012,408 A * | 4/1991 | Conroy .................. 711/172 |
| 5,301,276 A * | 4/1994 | Kimura .................... 710/9 |
| 5,303,201 A | 4/1994 | Sakamoto |
| 5,491,804 A | 2/1996 | Heath et al. |
| 5,696,928 A | 12/1997 | Grewe et al. |
| 5,793,989 A | 8/1998 | Moss et al. |
| 5,911,147 A * | 6/1999 | Onodera et al. ............ 711/5 |
| 6,040,622 A | 3/2000 | Wallace |
| 6,166,653 A * | 12/2000 | Schulmeyer et al. ... 340/825.52 |
| 6,279,114 B1 | 8/2001 | Toombs et al. |
| 6,438,625 B1 * | 8/2002 | Olson ..................... 710/9 |
| 6,438,638 B1 | 8/2002 | Jones et al. |
| 6,634,561 B1 | 10/2003 | Wallace |
| 6,820,148 B1 | 11/2004 | Cedar et al. |
| 6,842,818 B2 | 1/2005 | Okamoto et al. |
| 6,901,457 B1 | 5/2005 | Tooms et al. |
| 6,941,403 B2 | 9/2005 | Cedar et al. |
| 6,945,465 B2 | 9/2005 | Nishizawa et al. |
| 6,948,016 B2 | 9/2005 | Cedar et al. |
| 7,177,964 B2 | 2/2007 | Cedar et al. |
| 7,305,505 B2 * | 12/2007 | Cedar et al. ............. 710/104 |
| 2001/0009505 A1 | 7/2001 | Nishizawa et al. |

OTHER PUBLICATIONS

SD Group, "SD Memory Card Simplified Specifications, Part 1 Physical Layer Specification", Version 0.96, Jan. 2000, pp. 1-28.

Toshiba SD Card Specification ver. 2.11, Toshiba Corporation, 2001.

"Notification of Transmittal of the International Search Report or the Declaration", International Searching Authority—European Patent Office, International Application No. PCT/US01/25550, dated Sep. 9, 2002, 6 pages.

SanDisk MultiMedia Card Product Manual, Rev. 2, 2000, SanDisk Corporation, pp. 1-86.

MultiMediaCard System Specification, Version 2.11 Official Release, Jun. 1999, MMCA, pp. 1-123.

Summary of the MultiMediaCard, Based on System Specification Version 2.2, MMCA Technical Committee, pp. 2-27, Jan. 2000.

SD Group, "SD Memory Card Specifications, Part 1, Physical Layer Specification, Version 1.0", dated Mar. 22, 2000, 117 pages, Sections 4.3.5, 4.3.6, 4.3.7, 6.5 and 7 redacted.

SD Group, "Supplementary Notes for: SD Memory Card Specifications, Part 1, Physical Layer Specification, Version 1.0, Mar. 2000" dated Jun. 2000, 5 pages, Items 3, 4 and 6 redacted.

SD Memory Card Specifications Part 1 Physical Layer Specification Version 1.0, SD Group, pp. 1-5, 10, 20, 27, 35 and 40, Mar. 22, 2000.

The Patent Office of the People's Republic of China, "Notification of the First Office Action", mailed in related Chinese application no. 01815580.4 on Apr. 16, 2004, 10 pages (including translation).

PCT/ISA, "Notification of Transmittal of the International Preliminary Examiniation Report", mailed in related PCT/US01/25550 on Nov. 27, 2002, 3 pages.

European Patent Office, "Substantive Examination," mailed in related European Patent Application No. 01 965 945.7 on Aug. 16, 2006, 2 pages.

Korean Intellectual Property Office, "Notice of Preliminary Rejection," corresponding Korean Patent Application No. 2003-7002335, mailed on Dec. 30, 2008, 5 pages (including translation.).

* cited by examiner

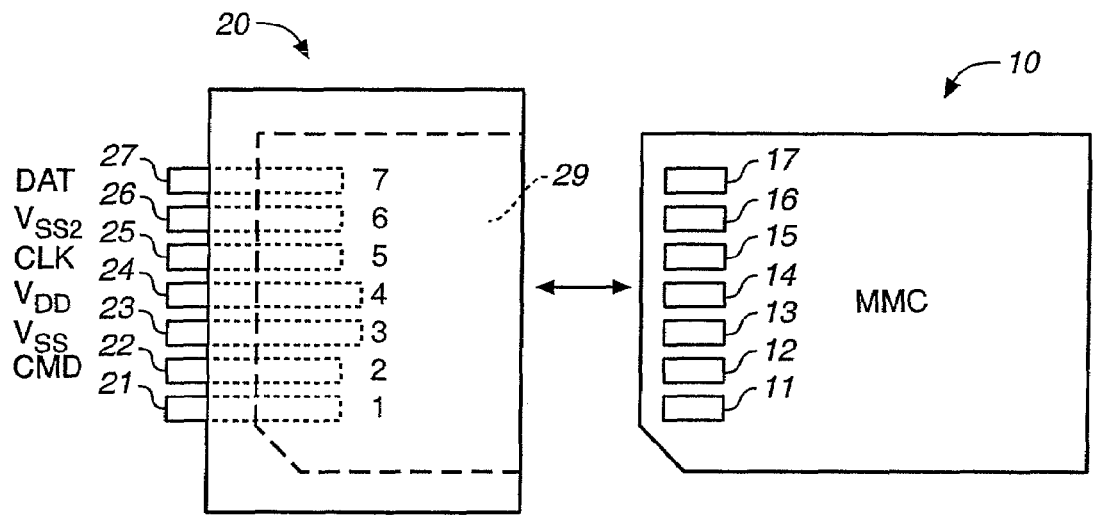
FIG._1
(PRIOR ART)
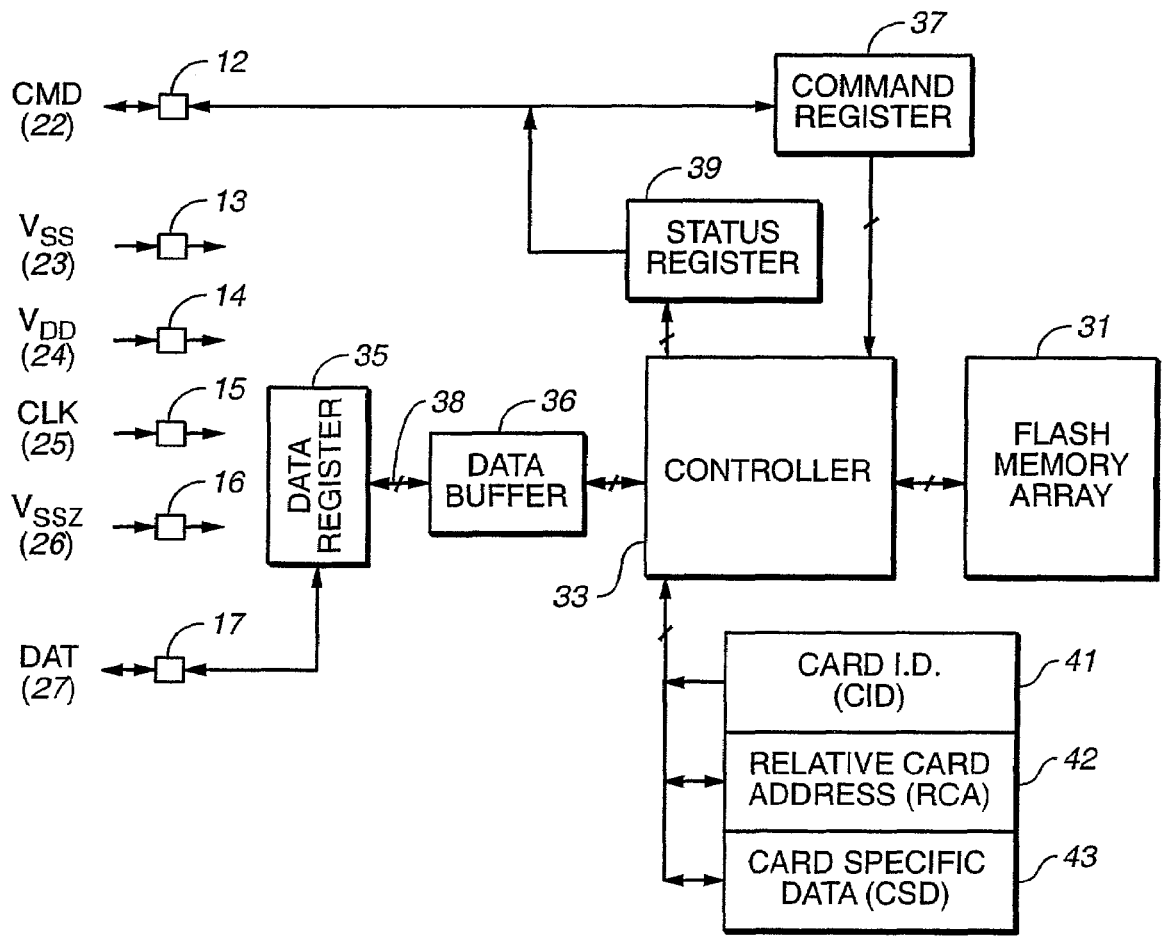
FIG._2
(PRIOR ART)

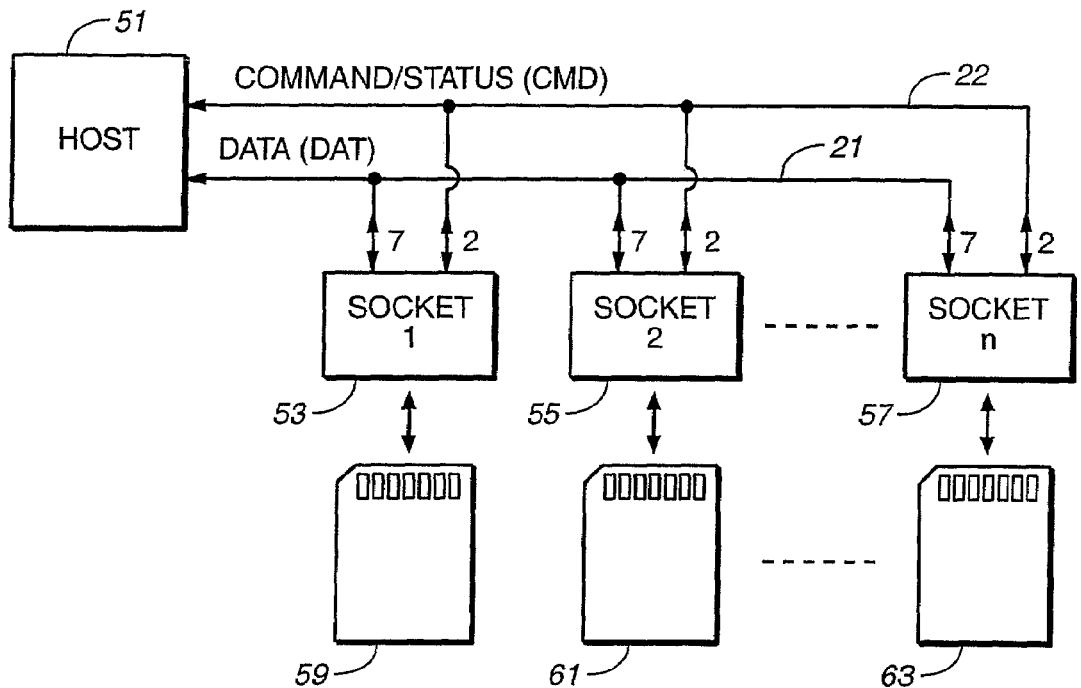
FIG._3
*(PRIOR ART)*
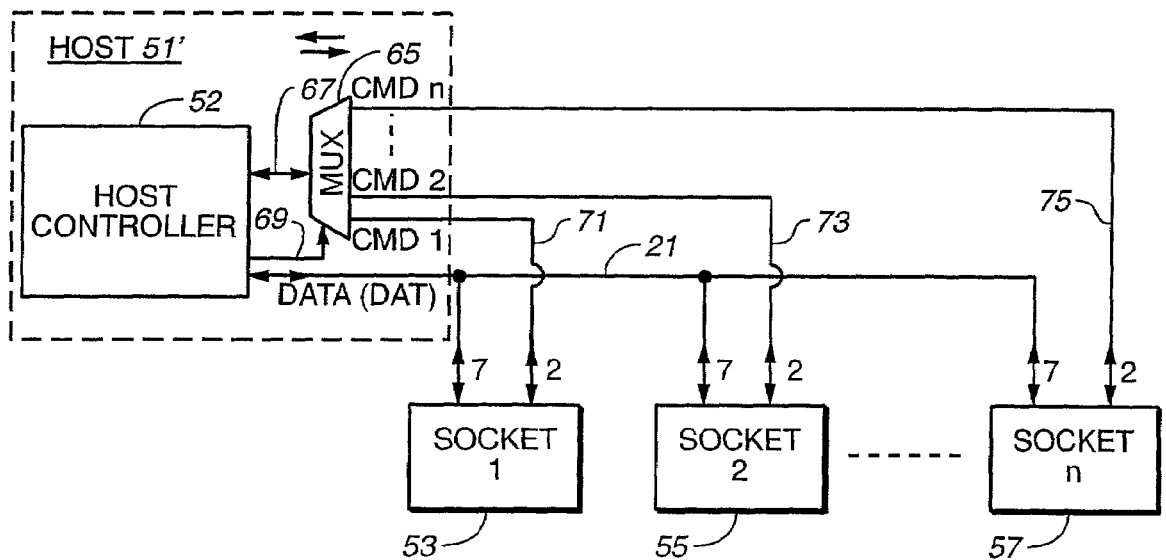
FIG._4

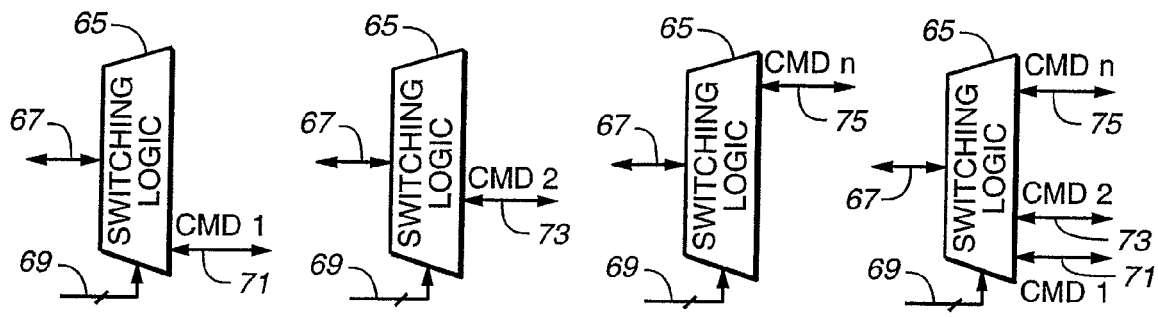
FIG._5A   FIG._5B   FIG._5C   FIG._5D
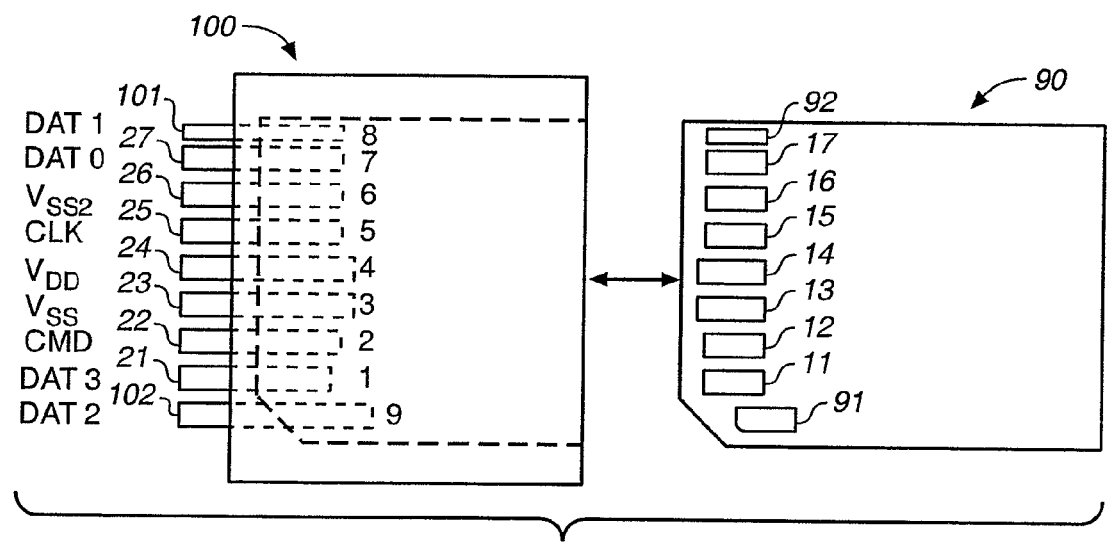
FIG._7

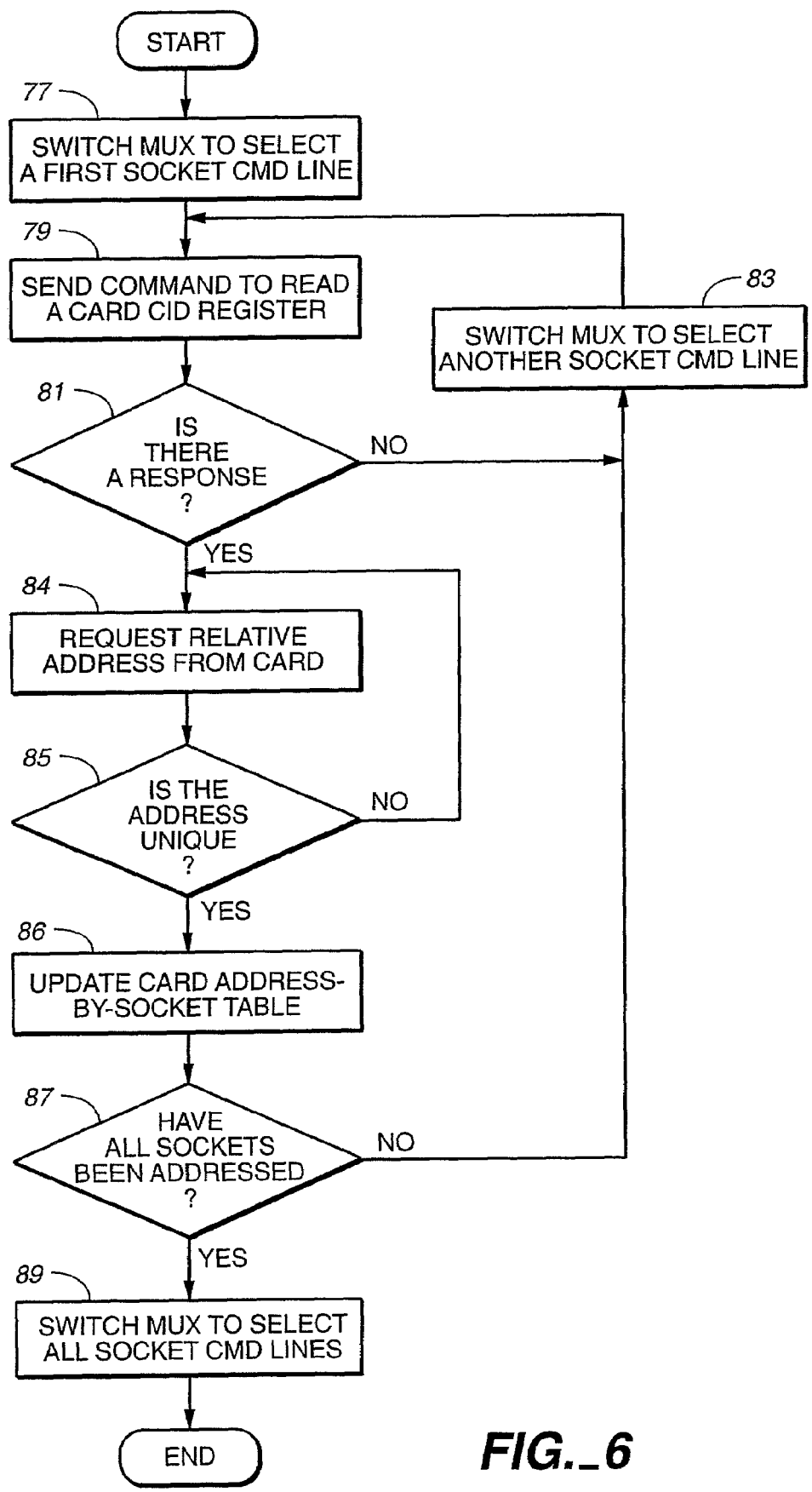
FIG._6

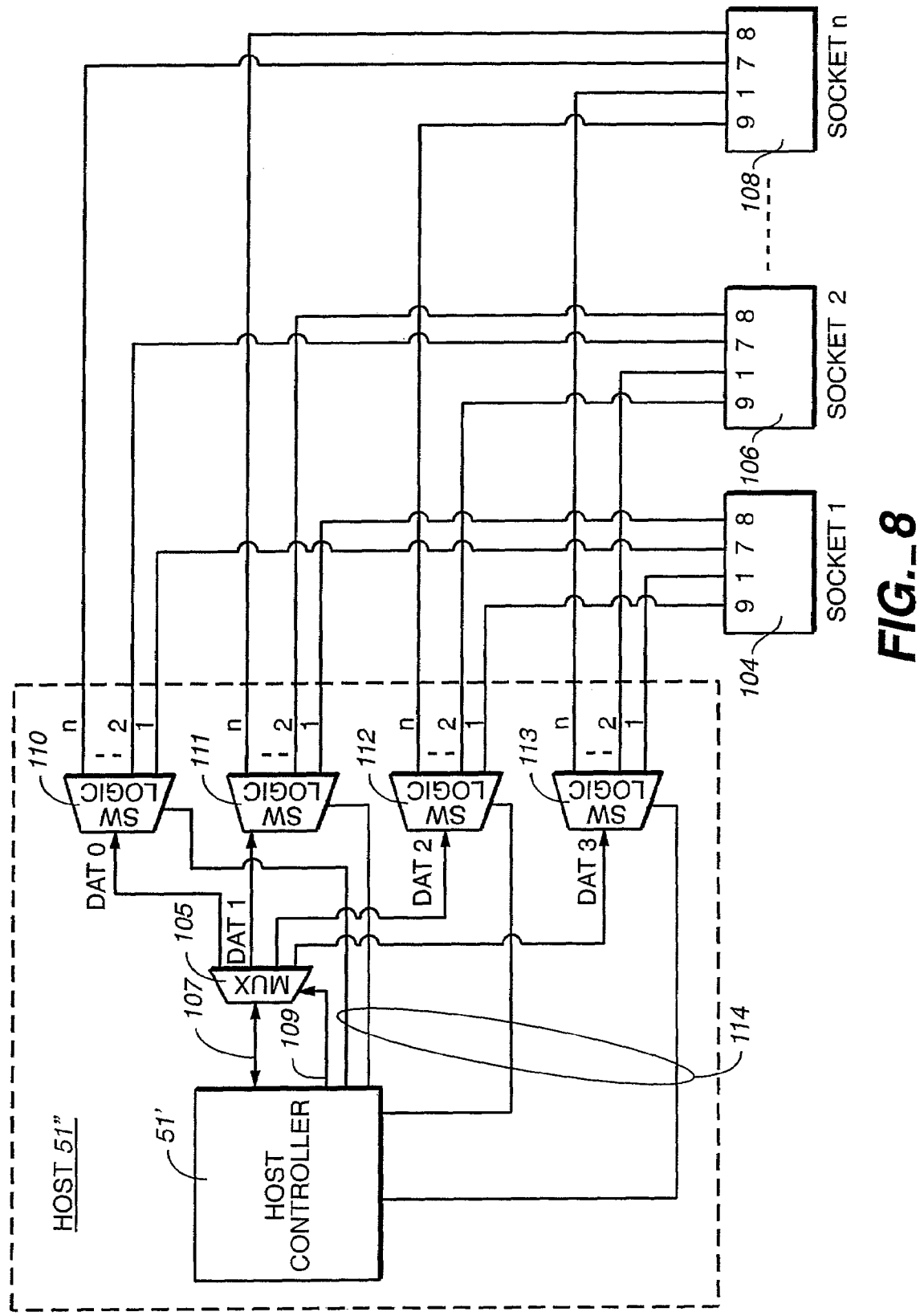
FIG._8

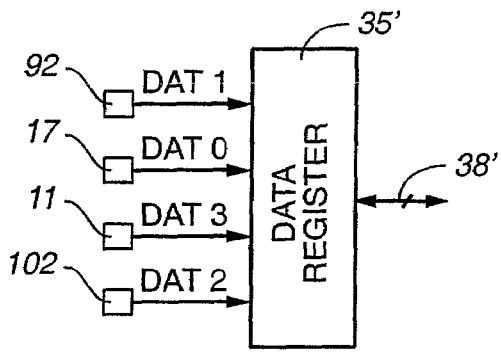
FIG._9
FIG._10A
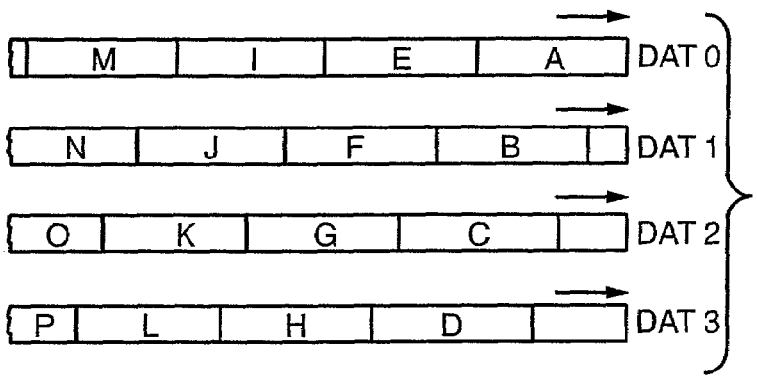
FIG._10B
FIG._10C
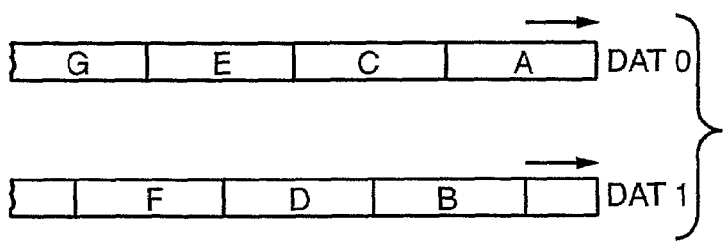
FIG._10D
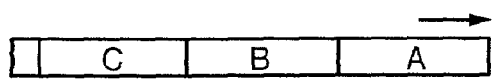
FIG._10E

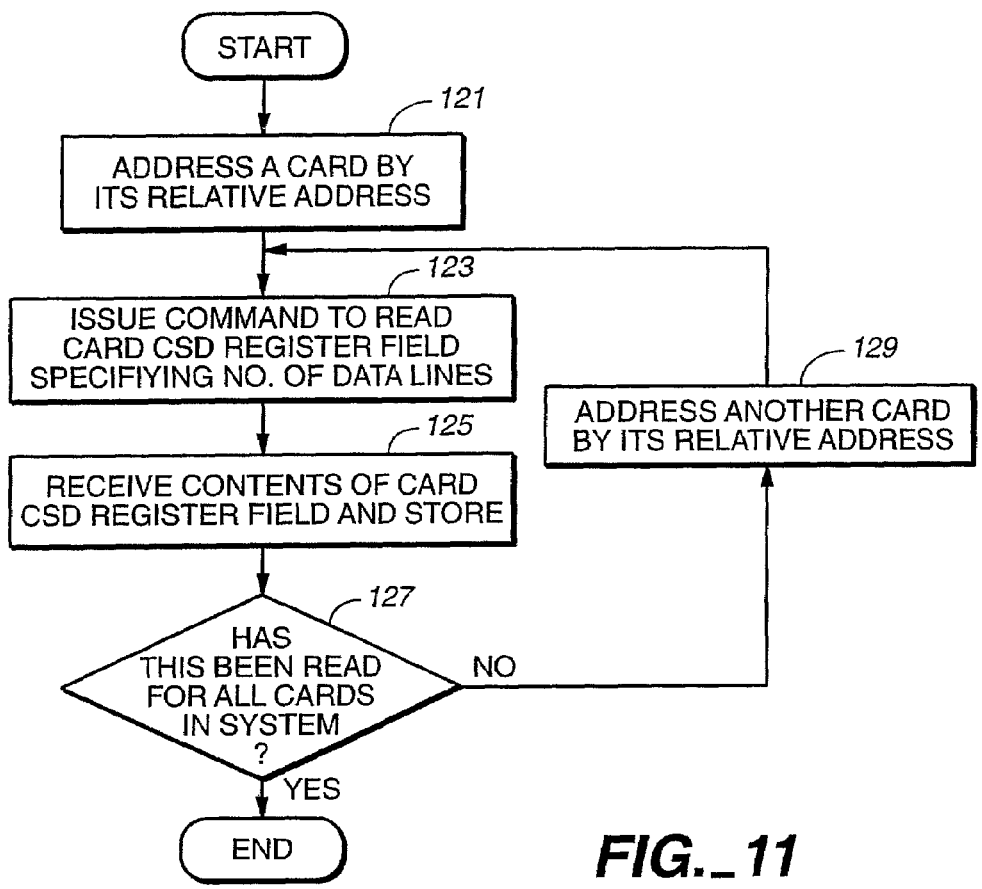
FIG._11
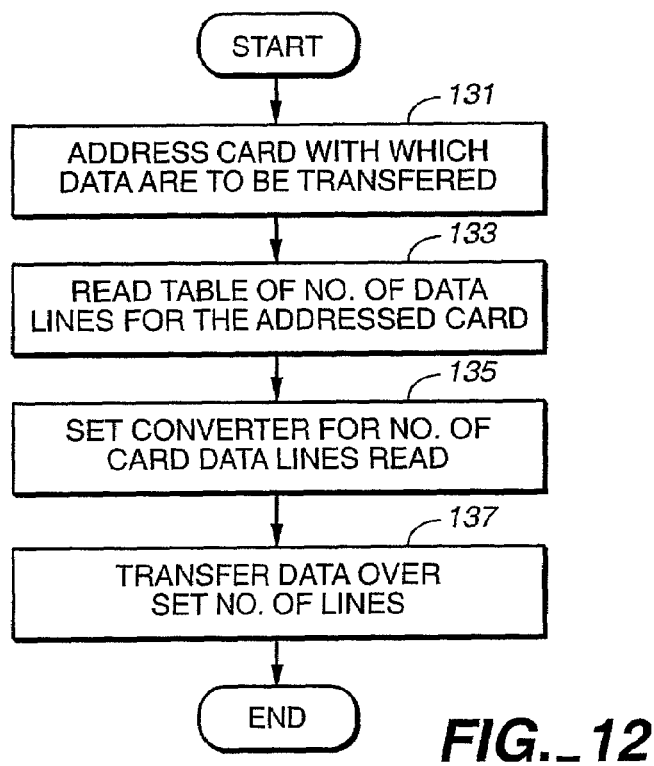
FIG._12

MULTIPLE REMOVABLE NON-VOLATILE MEMORY CARDS SERIALLY COMMUNICATING WITH A HOST

CROSS-REFERENCE TO RELATED APPLICATIONS

This application is a continuation of application Ser. No. 11/673,958, filed Feb. 12, 2007, now U.S. Pat. No. 7,305,505, which in turn is a continuation of application Ser. No. 11/205, 342, filed Aug. 16, 2005, now U.S. Pat. No. 7,177,964, which in turn is a continuation of application Ser. No. 10/849,748, filed May 19, 2004, now U.S. Pat. No. 6,948,016, which in turn is a continuation of application Ser. No. 09/641,023, filed Aug. 17, 2000, now U.S. Pat. No. 6,820,148, which applications are incorporated herein in their entirety by this reference.

BACKGROUND OF THE INVENTION

This invention relates to electronic circuit cards and their use in a system having one or more card sockets wired to a host device, particularly to small encapsulated cards containing significant amounts of re-writeable non-volatile memory such as flash EEPROM (electrically erasable and programmable read-only-memory) and the system in which they operate when removably inserted into multiple card sockets.

Small cards containing non-volatile semiconductor flash EEPROM systems have become popular for storing multiple megabytes of data from personal computers, notebook computers, personal electronic assistants, cellular telephones, cameras and other electronic devices requiring removable data storage. The applications of such memory cards are increasing rapidly, currently being used to store music downloaded from the Internet. Music data is normally transmitted over the Internet in a compressed form, such as by a well known MP-3 algorithm, and stored in the compressed form on a card for later decompression and reproduction on an analog playing device. Very small battery powered portable players with a memory card slot (socket) are beginning popular. The use of such cards to store and transfer video and other high capacity data is likely in the future as the bandwidth of the Internet and connections thereto increase, as the storage capacity of the memory cards increases and as the efficiency of data compression algorithms increases.

A card that is especially adapted for these and other applications is the MultiMediaCard ("MMC") that is only 32 millimeters long, 24 millimeters wide and 1.4 millimeters thick. The physical and electrical specifications for the MMC are given in "The MultiMediaCard System Specification" that is updated and published from time-to-time by the MultiMediaCard Association ("MMCA") of Cupertino, Calif. Versions 2.11 and 2.2 of that Specification, dated June 1999 and January 2000, respectively, are expressly incorporated herein by this reference. MMC products having varying storage capacity up to 64 megabytes in a single card are currently available from SanDisk Corporation of Sunnyvale, Calif., assignee of the present application. These products are described in a "MultiMediaCard Product Manual," Revision 2, dated April 2000, published by SanDisk corporation, which Manual is expressly incorporated herein by this reference. Certain aspects of the electrical operation of the MMC products are also described in co-pending patent applications of Thomas N. Toombs and Micky Holtzman, Ser. Nos. 09/185,649 and 09/186,064, both filed Nov. 4, 1998, and assigned to SanDisk Corporation, now U.S. Pat. Nos. 6,279,114 and 6,901,457. The physical card structure and a method of manufacturing it are described in U.S. Pat. No. 6,040,622, assigned to SanDisk Corporation. Both of these applications and patent are also expressly incorporated herein by this reference.

MMC products have a serial interface that uses only six electrical contacts, one for transfer of data, one for receiving commands and sending responses (status indications), one to receive a clock signal and three to receive power. A spare contact has been included for future use. The few number contacts simplifies the cards' use with host systems, particularly portable ones, and allows the size of the cards to be reduced. Of course, the rate at which data can be transferred into and out of the card is limited for a given clock frequency by use of a single data contact, as opposed to transferring data in parallel through multiple contacts as done in other larger memory cards having different formats. Host systems often provide two or more sockets for the simultaneous use of two or more MMC products. All the data contacts of multiple inserted memory cards are connected by a single line to the host processor, all the command/response contacts are similarly connected to the host processor by a single line, and all the clock contacts of the cards are connected together to a common clock source.

The host is required, as part of a system initialization routine, to assign a unique address to each card inserted in multiple system sockets. A unique card identification ("CID") number is stored in a register of each card by its manufacturer in a manner that it can be read by a host but this number has a very large binary size. Since a card's address either precedes each command, or is included in the argument of others, that is transmitted over a the single command/response line to all cards, for example, the use of a very large address can significantly slow down operation of the multiple card system. Transmission of the long manufacturer's identification is not necessary for addressing just a few cards used in a typical system. Only 1 bit is needed to address two cards, and two bits for up to 4 cards, for example. Therefore, on initialization, a small relative card address is written into an internal card register that is provided for this purpose, referenced as the relative card address register ("RCA").

In order for the host processor to initially be able to address each card in turn to assign such addresses, the host commands all cards of the system to simultaneously transmit their manufacturer identification codes bit-by-bit until a combination of bits from all the cards results in all but one of the cards becoming inactive. The relative address is then written by the host into the RCA of the one remaining card, and the process is thereafter repeated for the remaining cards until each of the cards is given a unique, small address. These addresses are then subsequently used by the host to individually access the cards in the system. This initialization technique is further disclosed in Patent Cooperation Treaty ("PCT") International Publication No. WO 97/38370 of Siemens Aktiengesellschaft, which publication is expressly incorporated herein by this reference.

It is expected that MMC products having a single card data storage capacity of 128 megabytes will be commercially available in the near future. This higher capacity and much more are currently commercially available in other flash EEPROM cards that are larger that the MMC products. With use of the current MP3 compression algorithm, over one hour of music can be stored on a single 128 megabyte card. And as the storage capacity of such cards increases further, and/or as compression algorithms further reduce the size of data files, music of even longer duration, and other types of digital data, can be stored on individual cards. Because of the many different ways that small non-volatile memory cards are contemplated to be used, it is desirable to maximize the flexibility and efficiency in their structure and use with the Internet, and their use in host systems that have a single card socket, as well as with hosts that have two or more sockets to utilize two or more memory cards at the same time.

SUMMARY OF THE INVENTION

A new non-volatile memory card has been developed which, among other improvements, adds electrical contacts to increase the data transfer rate with the card and alters the way in which relative addresses are assigned to each of multiple cards of a system. This new product is called a Secure Digital ("SD") Memory Card, a specific example of a card that implements the various aspects of the present invention. The size and shape of the SD Card are preferably made the same as the MMC in plan view but the thickness of the SD Card can be either the same 1.4 millimeters as the MMC, or may be made to be greater than that of the MMC, an example being 2.1 millimeters with the external contacts of the SD Card being slightly recessed. The SD Card contains additional external electrical contacts but the positions of the other contacts are the same as those of the MMC in order that sockets designed to accept the SD Card will also accept the MMC card. The electrical interface with the SD card is further made to be, for the most part, backward compatible with the MMC product described in version 2.11 of its specification referenced above, in order that few changes to the operation of the host need be made in order to accommodate both types of card.

According to one aspect of the present invention, the host system and cards are modified to cause relative addresses to be assigned to each of multiple SD Cards, or other electronic circuit cards with similar host interfaces, in less time than now required for the MMC products. Specifically, a separate command/response line is connected between the host and each of the card sockets of the system. The host then, during system initialization, controls the assignment of unique relative addresses to the cards by communication between the host and each card over the card's individual command/response lines. After this initialization, however, all of the socket command/response lines are then connected together so that the host communicates with all cards through a single command/response line in the same manner as the MMC. The MMC thus remains compatible with the SD Card in this aspect of its operation after initialization. The SD Card is simplified by eliminating the open drain circuits that are connected to the command/response contacts of the MMC products. This new technique temporarity adapts a system having all card sockets wired to a single common command/response line into a point-to-point communications system for the limited purpose of initializing each card with a relative address that is thereafter used by the host to communicate with the individual cards over the common command/response line. Other techniques to individually address the cards, such as by adding a chip select line to each socket, would require further modifications to the SD Cards and the host interface with them so that the MMC products could thus not be used with the modified system.

According to another aspect of the present invention, the SD Card has two or more data contacts, instead of the single data contact used in the MMC products. Two or more data lines are then included between the host processor and each of the card sockets in order to simultaneously transfer two or more bits of data between the host and an addressed card. Information readable by the host is permanently stored in each card to indicate the number of data contacts of the card. The host then adapts to transfer data between it and that card through all of the available data lines which the card supports. The cards of a multiple card system need not all have the same number of data contacts since the host can transfer data between itself and different cards over different numbers of the common multiple data lines. The modified system can operate with existing MMC products by transferring data over only one of the multiple data lines. This aspect of the invention also has application in systems with a single card socket, since cards with different numbers of data contacts can be interchanged and the host will adapt to a new card by reading its characteristic and configuring the data transfer over all of the system data lines to which the card is connected.

According to a further aspect of the present invention, a serial data stream, such as a one-bit wide stream, is transmitted in parallel through two or more data paths (lines) by alternately directing a fixed number of consecutive data bits at a time, such as one bit, through each of the multiple data lines in sequence, and then reconstructing the data stream from the multiple lines by performing an inverse combination of data bits from the multiple lines. This technique is useful when it is necessary to adapt to a variable number of data lines, particularly when data is being transmitted between a host and a specific memory card over a number of data lines equal to the number of data pins on the card, a number that can vary from one to some multiple such as four. In a specific embodiment, the host adapts to the number of data lines by reading that number from a register in an addressed card before transmission of data begins between the host and that card.

Each of the foregoing aspects may be utilized alone or they may be combined in an improved electronic card system. The present invention includes combining serial communication between the host and multiple memory cards with point-to-point communication between them in a manner that improves system performance and flexibility, all while maintaining compatibility with an existing system that uses only serial communication between them.

Additional features and advantages of the present invention are included in the following discussion of specific embodiments thereof, which discussion should be taken in conjunction with the accompanying drawings.

BRIEF DESCRIPTION OF THE DRAWINGS

FIG. 1 shows and existing MMC card and a socket in which the card is inserted;

FIG. 2 is a block schematic diagram of the existing MMC card of FIG. 1;

FIG. 3 illustrates an existing memory system that utilizes multiple MMC cards and sockets shown FIGS. 1 and 2;

FIG. 4 shows a memory system utilizing multiple memory card sockets with multiple command/response lines connected to them, according to a first aspect of the present invention;

FIG. 5A-D show operable conditions of a switching element of the system of FIG. 4;

FIG. 6 is a flow diagram illustrating operation of the memory system of FIGS. 4 and 5A-D;

FIG. 7 shows a memory card and socket in which the card is inserted, according to a second aspect of the present invention;

FIG. 8 illustrates a memory system utilizing multiple memory card sockets of the type shown in FIG. 7 and having multiple data lines connected to them;

FIG. 9 shows a modification to one element of the MMC card schematic diagram of FIG. 2 that is used in the memory card illustrated in FIG. 7;

FIGS. 10A through 10E illustrate the flow of data through the memory system of FIG. 8;

FIG. 11 is a flow diagram illustrating one aspect of operation of the memory system of FIGS. 7-9; and FIG. 12 is a flow diagram illustrating another aspect of operation of the memory system of FIGS. 7-9.

DESCRIPTION OF THE MMC PRODUCT AND SYSTEM

With reference to FIG. 1, an existing MMC card 10 of the type described in the Background above is insertable into a slot 19 of a socket 20. The card 10 includes a row of seven electrical contacts 11-17 in a surface of the card and extending along one of its short edges. The socket 20 includes seven mating contact pins 1-7 connected to respective lines 21-27. The card contact 12 serially receives command signals from a host and serially sends a response (status signals) to a host. Mating socket pin 2 is thus connected with a command/response ("CMD") line 22. Serial data is received through the card contact 17 for storage in its non-volatile memory, and serial data is sent through the contact 17 when read from the memory. The line 27, connected to the socket pin 7 that mates with the card contact 17, is the socket's serial data ("DAT") line. These two lines 22 and 27, along with a clock signal input line 25, which is connected with the card contact 15 through the socket pin 5, provide an interface with a host computer or other device for operating the memory system within the card 10. Three card contacts 13, 14 and 16 receive an operating voltage from a host system or device, connected through respective socket pins 3, 4 and 6 to external lines 23 ("Vss"), 24 ("Vdd") and 26 ("$Vss_2$"). Card contact 11, and thus the socket pin 1 and line 21, are not used but were included for possible future use.

Pertinent portions of the memory and controller system within each MMC card 10 are illustrated in FIG. 2. An array 31 of flash EEPROM cells provides non-volatile storage of digital data. A controller 33 manages operation of the array 31 and interfaces with a host system through the card contacts 12-17. Data serially received through the contact 17 are written to a register 35, transferred in parallel into a data storage buffer memory 36, from the buffer 36 to the controller 33 and then to the memory cell array 31 for storage therein. Conversely, data read from the memory cell array 31 are transferred in parallel by the controller 33 into the buffer 36 and from the buffer 36 in parallel into the register 35. The read data are then serially transferred out of the register 35 through the card contact 17.

Similarly, commands from a host are sent serially through the contact 12 and stored in a register 37, and then read in parallel by the controller 33. Status information is loaded by the controller 33 in parallel into the register 39, thereafter to be read serially through the card contact 12. The types of commands and responses that are transferred in this way are many. For example, if a host wants to write data into the array 31, it sends a write command through the CMD line 22, followed by the data to be written being sent through the DAT line 27. After the commanded write operation is completed, the controller 33 writes a status indication thereof in the register 39 and the host can then read that status to confirm that the commanded operation has been completed.

Several other registers are provided in the MMC card 10, three of them being shown in FIG. 2. A memory card identification CID register 41 is not re-writeable by the user but rather is read-only to provide the host with an identification that is unique for each card. A relative card address register RCA 42 is written by the host in a multi-card system during initialization, and when the card is added or replaced in a system, with an address that is thereafter used by each card to determine whether a command on the common CMD line 22 is intended for that card or not. The relative address only needs to be a few bits in length, depending upon the number of cards within a system that need to have unique addresses. This is much shorter than the manufacturer's unique identification that is stored in the CID register 41, and thus its use speeds up addressing the card. Each command from the host is accompanied by or includes the relative address previously written into the RCA register 42 of one card in the system, and that card then responds to carry out the command while the other cards of the system, having other relative addresses written into their RCA registers 42, do not respond.

A card specific data register 43 ("CSD") includes information of the data format, data access characteristics, and similar information of the particular memory array 31 and controller 33. Most of this data are written by the manufacturer and so cannot be re-written by the user. The CSD register data is used by the host to set its parameters in communicating with the cards of a system, including the format of data being transferred, how that data is accessed, and similar matters.

Such a memory system is illustrated in FIG. 3, wherein a host device 51, which can be a personal computer, hand-held organizer, digital camera, audio reproduction system, or similar type of device, is connected over lines 22-27 with a plurality of card sockets 53, 55 and 57 that receive respective MMC cards 59, 61 and 63. Such a multi-card system includes at least two such sockets and often many more. As mentioned above, commands and responses are communicated over a single CMD line 22 that is connected with the pin 2 of each of the sockets in the system. The unique relative address stored in the RCA register 42 (FIG. 2) of one of the cards 59, 61 or 63 inserted into the sockets is sent by the host 51 with or as part of the command to address only one of those cards to receive and act upon the command. Similarly, data is transferred between the host and the cards over the single DAT line 21 that is connected with the pin 7 of each of the sockets. A constant frequency clock signal is also connected (not shown in FIG. 3) from the host to pin 5 of each of the sockets over a single line 25. The MMC specification calls for the clock to be up to 20 Megahertz.

The technique presently used by a host to write a unique relative address into each card's RCA register 42 uses circuitry within each card to allow the host to address them one at a time before any relative address exists. The host commands each card to read one bit at a time of its manufacturer's identification number permanently written in its CID register 41 of each card. Each card tends to affect the voltage on the common command and response line 22 through an open drain circuit in accordance with a bit of its identification code. If that line voltage is different from what would be caused by the read bit value, the card then switches itself to an inactive state. When the host determines that only one of the cards remains connected, it writes a unique relative address in that card's RCA register 42 through the command and response line 22. This card then disconnects itself from the command and response line 22 and the process continues for the remaining cards until a unique relative address is written into the CID register of each of the cards in the system.

Description of SD Card and System

Use of Multiple Command/Response Lines

A modified system that makes it easier for individual addresses to be assigned to multiple cards, without having to change the cards' internal circuitry in any significant way, is illustrated in FIG. 4, where elements common with those of FIGS. 1-3 are given the same reference numbers. A host 51' is similar to the host 51 (FIG. 3) but includes a controller 52 that interfaces differently with the memory cards' command/response lines. Instead of a common command and response line being connected to pin 2 of each of the sockets, separate lines 71, 73 and 75 are connected to pin 2 of respective sockets 53, 55 and 57. Each of the separate command/response lines 71, 73 and 75 is one output of switching logic 65 which operates to switch a single command/response line 67 of the controller 52 among the individual lines 71, 73 and 75 in response to a control signal from the host in a circuit 69. The permitted connections of the switching logic 65 are shown in FIGS. 5A-D. The switching logic 65 can select any one of the individual socket command/response lines 71, 73 or 75 for connection by itself to the line 67, as shown in FIGS. 5A-C, respectively. In any of these cases, signals pass in both directions through the logic 65 between line 67 and the selected one of the lines 71, 73, 75 etc. In another connection illustrated in FIG. 5D, all of the lines 71, 73, 75 etc. are connected together to the line 67 to enable the host to simultaneously broadcast commands to all card sockets. The logic 65 preferably, however, allows only one card socket command/response line to be connected with the line 67 at a time when the host is receiving responses from a card. Of course, although three individual socket command/response lines are illustrated, two such lines will be used if the system contains only two card sockets. If the system contains more than three card sockets, more than three command/response lines are used, one for each socket.

The steps executed by the system to cause a unique relative address to be written into the RCA register of each card that is inserted into the sockets of the system of FIG. 4 are illustrated in FIG. 6. This routine is performed when a system is being powered up or otherwise being initialized. It is also performed after initialization when new card is inserted into a socket, but only as to that card. A separate card detect circuit (not shown) is connected between the host 51' and each of the card sockets 53, 55 and 57 (FIG. 4) to alert the host when a card is inserted or removed.

A first step 77 in the initialization process is to cause the switching logic 65 to connect one of the command/response lines 71, 73 or 75 to the line 67. In a next step 79, the host 51' then reads the CID register 41 of any card that is inserted into the socket to which the selected command/response line is connected. Although the purpose in this process is to determine whether a card exists in that socket, which occurs in a step 81, the CID is read by the host and stored since it typically contains information about the card that the host can utilize to communicate with it. If no card is detected in that socket, as indicated by a step 83, the logic 65 is switched to select a different one of the command/response lines 71, 73 or 75, and the steps 79 and 81 are repeated to determine whether a card exists in the socket to which the newly selected command/response line is connected.

When a card is detected in the addressed socket, the host requests a relative address from the card, as indicated by a step 84. Prior to this, in a specific implementation, the addressed card has generated its own address and written it into its RCA register. The host then reads that address from the card in the addressed socket and checks a table it maintains of card addresses to see if the suggested address has been previously assigned to another card, as indicated by a step 85. If the suggested address is determined to be unique, it stays in that card's RCA register and the host, as indicated by a step 86, adds it to a table of card addresses that it maintains by socket number. In a specific example, the card generates a 32 bit address from a random number generator included on the card. With this many bits, it is unlikely that one card will suggest the same address as another, particularly in the usual system having only a few cards. But if a conflict with a prior address is determined in the step 85 to exist, the host causes the card to generate and store another address in it's RCA register and itself repeats the steps 84 and 85 with respect to the new address.

As an alternative to each card generating its own address, but not preferably, the host could assign a unique relative address to each card by addressing one card at a time and writing a unique one of many possible addresses into the RCA register of the addressed card.

After the address assigning process is completed for one card, a next step, as indicated by a step 87, the logic 65 is either incremented to connect with the next individual socket (step 83) or, if the process has been accomplished for all the sockets, the logic 65 is switched into the state shown in FIG. 5D, as indicated by the step 89. After it is confirmed that each card in the sockets 53, 55 and 57 has had a unique relative address written into its RCA register, the system is reconfigured back into the state illustrated in FIG. 3 by connecting all the command/response lines 71, 73 and 75 together. The host then sends commands to all cards in the system at the same time over all the CMD1, CMD2, and CMDn lines, as in the case of the MMC system, but is connected to receive response signals from only one card at a time because of the nature of the switching logic 65.

An advantage of this system is that the SD Card can be simplified by eliminating the circuitry used in the MMC to cause each card to be addressed in turn during initialization. At the same time, existing MMC cards can also be used in the system of FIGS. 4 and 5. When this is desired, the host recognizes whether an SD Card or an MMC card is in each of its system's sockets, such as from the CID that is read from each card. The host then applies the communication protocols and routines to each socket that are appropriate for the card in that socket. The address assigning routine and a card reset operation, for example, are different, as are other sequences. Since the clock rate of the SD Card can be made higher, up to 25 Megahertz, the host will pick the lower clock rate of the MMC card if one is used in the system. When the host is provided with the capability of operating with both types of cards, the user need not distinguish whether the memory card being inserted in one of the system sockets is a new SD Card or an existing MMC card.

The individual socket command/response lines of the system of FIGS. 4 and 5 could alternatively be used to direct all commands to individual sockets, rather than including the relative addresses with or as part of the commands as now done in the MMC system, but the new system would then not be compatible with the MMC cards and require the host to communicate quite differently with each type of card.

Another advantage of the system of the new SD Card is that the host knows the socket in which a card of a given address is inserted. This is because the address is loaded into a card's RCA register while the CMD line to that socket is active. This makes it easier to handle the situation where one card is replaced or a new card is added. With the SD Card, only the new card needs to have an address assigned as part of its initialization. In the MMC system, because only a single CMD line exists, the host cannot know the socket in which a particular card is inserted. The substitution or addition of a card to an MMC system makes it necessary to initialize the all the cards in the system, thus causing a delay before the system can continue to operate.

Selectable Data Bus Width

A second aspect of the present invention is shown in FIGS. 7-12, wherein the data transfer feature of the new SD Card is described. The rate at which data is transferred between the host and an individual card is increased by increasing the number of data lines connected to each card socket over which data are simultaneously transferred. In this example, four data lines are shown, which contribute to increase the rate of data transfer by up to four. Data is transferred over only one of the multiple data lines between a host and an MMC card. In the specific implementation of the SD Card, the number of data lines used at one time is either one or four.

The SD Card 90 and mating socket 100 are shown in FIG. 7. Although the first aspect of the present invention, described above with respect to FIGS. 4-6, may be implemented with a card having the same number of contacts as the MMC card 10 of FIG. 1, this aspect of the present invention causes the SD Card to have an increased number of electrical contacts. The SD Card 90 has the same contacts 11-17 as the MMC card 10 of FIG. 1, and in the same relative positions, but also has two new contacts 91 and 92 added for the transmission of data. The spare contact 11 of the MMC card is now also used by the SD Card for data transfer. Thus, four contacts 11, 17, 91 and 92 are used by the SD Card for transferring data into and out of the memory within the card 90. A mating socket 100 (FIG. 7) similarly has the same pins 1-7 as the socket 20 of FIG. 1, plus two additional pins 8 and 9. The result is four data lines 27 (pin 7), 101 (pin 8), 102 (pin 9), and 21 (pin 1) connected to each card socket.

The modified system is shown in FIG. 8, where a host 51" has been modified to enable simultaneous transfer of data over more than one data line to each of multiple sockets 104, 106 and 108 that individually have the structure of the socket 100 (FIG. 7). The four data lines 21, 27, 101 and 102 are commonly connected each of the sockets and to a multiplexer 105 through switching logic circuits 110, 111, 112 and 113. A single stream of data in a line 107 that is to be stored into a card inserted into one of the sockets 106-108 is alternately switched by the multiplexer, in response to a control signal from the host controller 52' in a line 109, among the four switching logic circuits 110-113 in time sequence. Similarly, when data are being read from a card, such a single data stream is assembled in the line 107 by the multiplexer 105 switching between the circuits 110-113.

One of the switching logic circuits 110-113 is provided for each of the multiple data lines that are connected to the card sockets, circuit 110 for data line DAT 0, circuit 111 for data line DAT 1, circuit 112 for data line DAT 2 and circuit 113 for data line DAT 3. They are controlled by signals on the lines 114 to the host controller 52'. During a write operation to a card in any one of the multiple sockets 104, 106 and 108, each of the switching logic circuits 110-113 has all four of its outputs connected to its input. Thus, data to be written is broadcasted to all of the sockets. When data are being read from one of the cards, however, each of the circuits 110-113 is switched to connect to the input line only the output line that is connected to the socket in which the memory card being read is inserted.

In order to accommodate the multiple data lines, the data register 35 of FIG. 2 and its operation, are modified in the SD Card, in a specific example, in a manner shown in FIGS. 9 and 10A-E. During writing, the host controller 52' (FIG. 8) generates a single stream of data in the line 107. Such a stream is illustrated in FIG. 10A, where the letters A, B, C etc. each represent one data bit. The multiplexer 105 connects the logic circuits 110-113 one at a time to the line 107 in sequence for the transfer of only one bit. This is indicated in FIG. 10B for the case of a memory card having four data contacts, and thus when all four of the data lines DAT 0, DAT 1, DAT 2 AND DAT 3 are being used. The multiplexer 105 sends the first bit A over data line DAT 0, the second bit B over data line DAT 1, the third bit C over data line DAT 2, the fourth bit D over DAT 3, and then starts over by sending the bit E to the data line DAT 0, and so forth. These four streams of data are received by the data register 35' and reassembled into the data sequence of FIG. 10A, which is then transferred in parallel through circuits 38' to a data buffer like the buffer 36 of FIG. 2. Each individual serial stream of data is preferably sent over its respective data line by accumulating its bits into blocks that each also include cyclic redundancy check ("CRC") bits calculated from the block's data. Each block includes a start bit, then the data, followed by the CRC and then a stop bit, in a specific example.

Although the data transfer rate of any one of the data lines is limited, the simultaneous transfer of data over multiple data lines increases that rate by approximately a multiple that is equal to the number of data lines. If two data lines are being used, for example, a data stream illustrated in FIG. 10C, having one-half the rate as that of FIG. 10A, is supplied in the line 107. The multiplexer 105 then switches this stream between data lines DAT 0 and DAT 1, resulting in data streams as illustrated in FIG. 10D. The data register 35' in an addressed card then reassembles the two streams DAT 0 and DAT 1 into that of FIG. 10C and transfers the data in parallel over lines 38'. If only one data line is being used, the multiplexer 105 remains connected with a singe data line, such as DAT 0, over which a data stream in line 107, having a reduced data rate, is directed, as shown in FIG. 10E.

Conversely, when data are being read from the memory, the data are loaded in parallel into the register 35' and sent over the data lines with one of the formats indicated in FIG. 10B, 10D or 10E, depending upon the number of data lines being used. If the data are being sent over more than one of the data lines, the multiplexer 105 switches back and forth among the data lines being used, in order to result in a stream of data in the line 107 that corresponds to that of one of FIG. 10A, 10C or 10E, depending upon the number of data lines that are being used.

It is desirable for the system of FIG. 8 to be able to accept cards having a varying number of data line contacts, one, two or any other number up to the number of data lines provided in the system (four such lines in this example), and to be able to freely intermix and interchange such cards in the system. For some applications, the high data transfer rate provided by the number of data lines of a system, four in this case, is not necessary. For those applications, a version of the SD Card is made with a lesser number of data pins. An accompanying reduction in the amount of interface circuitry in the card also occurs, and thus the card's cost is reduced. Cards with two active data pins are useful, as are those with only one.

In order to be able to use cards with different numbers of data lines in the same system, a read-only field is preferably provided in the individual cards that is read by the host to determine over how many data lines it can communicate with that card. In a specific implementation, this is included in an SD Card Configuration Register ("SCR") that is added to the registers shown in FIG. 2 for the MMC card. The host 51" reads this field upon power-up, an initialization at some other time or whenever a new card is inserted into a socket, and thereafter transfers data addressed to each card over the number of data lines that the card can accommodate. But since there is some cost involved to provide additional circuitry necessary for each added data line, some cards are designed to work with a lesser number of data lines. Conversely, the host can be designed to operate with a lesser number of data lines than possible. If the added speed of data transfer is not necessary for a particular application, then the added complexity and cost to provide the higher data transfer rates can be avoided, both in cards and in host systems.

The ability to dynamically select the width of the data bus between a host and one or more memory cards results in the host being able to maximize the transfer rate of data between it and whatever memory cards are inserted into the system. Although other techniques of breaking up a data stream between the multiple data lines are certainly possible, the techniques described above and illustrated in FIGS. 10A-10E are preferred for the adapting the host to cards with different data bus widths, to do so dynamically as cards are substituted or added, and even communicate with each of a mixture of cards having different bus widths by using the maximum number of data lines of the individual cards. Another technique is to alternate sending packets of multiple sequential data bits along each data line. But this requires some overhead to keep track of the packets and the like. It is simpler to alternate sequential bits of a data stream through multiple parallel data paths one bit at a time, as described above, particularly when the system needs to adapt to cards having different numbers of data lines. Indeed, this data transfer technique has other applications than the memory system being described here.

The flow chart of FIG. 11 illustrates one aspect of a method of operating the memory system of FIGS. 7-10E, wherein the host 51" ascertains the number of data lines with which each card installed in the two or more sockets 104, 106 and 108 is designed to operate. In a first step 121, the host addresses one of the cards over the command/response line 22 by the card's relative address that has already been written in its RCA register 42 (FIG. 2). Next, in a step 125, the number of data lines for the card is read by the host from its SCR register. This number is then stored by the host, as indicated by a step 125, preferably in a table form. If all the cards in the sockets of the system have been read, the process ends but if not, a step 129 addresses another of the cards of the system and the steps 123 and 125 are repeated for that other card.

FIG. 12 is a flow chart that illustrates how the host 51" uses the stored data of the number of data lines for the cards in the system. Whenever a particular card socket is addressed by the host, as indicated by a step 131 the host reads the number of data lines for that card from an internal table constructed by the process of FIG. 11. This is indicated by a step 133. The host then, as indicated by a step 135, operates the multiplexer 105 to transfer data over the number of the four data lines DAT 0, DAT 1, DAT 2 and DAT 3 that is read from that table. In a next step 137, data is transferred over that number of data lines, whether to or from the card. In the case of a card with only one data line, in a specific example, the host preferably transfers data with the card over the line 27 (DAT 0) since that utilizes the same card contact 17 as the MMC products, thus making the system compatible with MMC cards. MMC cards can be used in the system of FIGS. 8-10E as well as the SD Cards. The host preferably communicates with each card over only the DAT 0 line during initialization in order to determine whether the card is an MMC or SD card, and, if an SD Card, the number of data lines it uses and other information about the card that enables the system to operate efficiently.

The system of FIG. 8 can use either a single command/response line 22 (not shown) according to the MMC design or the multiple command/response line system described above with respect to FIGS. 4-6. This choice does not affect the structure or circuitry of the card.

Although the various aspects of the present invention have been described with respect to specific embodiments thereof, it will be understood that the invention is entitled to protection within the full scope of the appended claims. Particularly, the invention is not limited to a system with any particular number of data lines or memory cards, the numbers used in the foregoing description being selected for the purpose of illustration only.

The invention claimed is:

1. A method of operating a system that includes a host electrically connected to a plurality of sockets with which a plurality of circuit cards are removably connectable, comprising:

initializing the system by the host sending a command through separate command lines to individual ones of the plurality of sockets, one at a time, which causes unique circuit card addresses to be stored in the individual circuit cards that are removably connected with the individual ones of the plurality of sockets, and thereafter transferring data between the host and one of the plurality of circuit cards by the host concurrently sending the unique address of the one circuit card through the separate command lines connected together to all of the individual ones of the plurality of sockets, wherein the one circuit card responds to the transfer of data with the host.

2. The method of claim 1, wherein the unique circuit card addresses are caused to be stored in the individual circuit cards by the host generating the circuit card addresses and writing them into registers within the individual circuit cards.

3. The method of claim 1, wherein the unique circuit card addresses are stored in the individual circuit cards in a manner to be readable by the host.

4. The method of claim 1, wherein the data transferred between the host and the individual circuit cards are stored in re-programmable, non-volatile semiconductor memory within the individual circuit cards.

5. A method of operating a system that includes a host electrically connected to a plurality of sockets with which a plurality of circuit cards are removably connectable, comprising:

initializing the system by the host sending a command to individual ones of the plurality of sockets, one at a time, which causes unique circuit card addresses to be stored in the individual circuit cards that are removably connected with the individual ones of the plurality of sockets, wherein, as part of initializing the system, the commands are sent to individual ones of the plurality of sockets through command lines separately connected between the host and each of the individual ones of the plurality of sockets, and thereafter transferring data between the host and one of the plurality of circuit cards by the host concurrently sending the unique address of the one circuit card to all of the individual ones of the plurality of sockets, wherein the one circuit card responds to the transfer of data with the host, wherein, during transferring data, the unique address of the one circuit card is sent over a plurality of the command lines by connecting the plurality of command lines together.

6. A method of operating a system that includes a host electrically connected to a plurality of sockets with which a plurality of circuit cards are removably connectable, comprising:

initializing the system by the host sending a command to individual ones of the plurality of sockets, one at a time, which causes unique circuit card addresses to be stored in the individual circuit cards that are removably connected with the individual ones of the plurality of sockets, and thereafter transferring data between the host and one of the plurality of circuit cards by the host concurrently sending the unique address of the one circuit card to all of the individual ones of the plurality of sockets, wherein the one circuit card responds to the transfer of data with the host, wherein the unique circuit card addresses are caused to be stored in the individual circuit cards by a command from the host that initiates a number generator within the circuit card to generate the unique circuit card address that is stored in the circuit card.

7. A method of operating a system that includes a host electrically connected to a plurality of sockets with which a plurality of circuit cards are removably connectable, comprising:

initializing the system by the host sending a command to individual ones of the plurality of sockets, one at a time, which causes unique circuit card addresses to be stored in the individual circuit cards that are removably connected with the individual ones of the plurality of sockets, wherein, as part of initializing the system, the host reads registers in the individual circuit cards that identify a number of one or more lines through which data may be transferred in parallel with the individual circuit cards, and thereafter transferring data between the host and one of the plurality of circuit cards by the host concurrently sending the unique address of the one circuit card to all of the individual ones of the plurality of sockets, wherein the one circuit card responds to the transfer of data with the host and, transferring the data between the host and the individual circuit cards over the number of lines read from the registers in the individual circuit cards.

8. A method of operation of a host system with at least first and second electronic circuit cards that are removably connected with respective first and second sockets that in turn are connected in parallel through a plurality of data lines with the host, comprising:

sending an address read command to the first socket through a first command line that connects the host to the first socket but not to the second socket, the address read command interrogating the first circuit card removably connected with the first socket to read an address stored in the first circuit card, if no address is read from the first circuit card, causing a first address to be written into the first circuit card, sending an address read command to the second socket through a second command line that connects the host to the second socket but not to the first socket, the address read command interrogating the second circuit card removably connected with the second socket to read an address stored in the second circuit card, if no address is read from the second circuit card, causing a second address to be written into the second circuit card, and thereafter concurrently sending one of the first and second card addresses through both of the first and second command lines together to the first and second sockets to address one of the first and second circuit cards for a transfer of data over one or more of the plurality of data lines between the host and the addressed one of the first and second circuit cards.

9. The method of claim 8, wherein causing the first address to be written into the first circuit card comprises the host causing circuits within the first card to generate the first address, and wherein causing the second address to be written into the second circuit card comprises the host causing circuits within the second card to generate the second address.

10. The method of claim 8, wherein causing the first address to be written into the first circuit card comprises the host generating the first address, and wherein causing the second address to be written into the second circuit card comprises the host generating the second address.

11. The method of claim 8, wherein the transfer of data over one or more of the plurality of data lines between the host and the addressed one of the first and second circuit cards comprises transferring the data over a number of one or more of the plurality of data lines specified by the addressed one of the first and second circuit cards.

12. The method of claim 11, wherein the first and second cards individually store the number of the one or more of the plurality of data lines over which the individual card is capable of transferring data in parallel, and the host causes the data to be transferred between the host and the addressed one of the first and second circuit cards in parallel over the stored number of one or more data lines.

* * * * *